United States Patent [19]

Nesbitt

[11] Patent Number: 4,544,587
[45] Date of Patent: Oct. 1, 1985

[54] WINDOW INSULATOR
[75] Inventor: William A. Nesbitt, Connersville, Ind.
[73] Assignee: Modern Modalities, Inc., Connersville, Ind.
[21] Appl. No.: 616,654
[22] Filed: Jun. 4, 1984
[51] Int. Cl.$^4$ ............................ B32B 3/12; B32B 3/30
[52] U.S. Cl. ........................................ 428/34; 52/171; 428/166; 428/167; 428/178; 428/906; 428/920
[58] Field of Search .............. 428/166, 172, 178, 920, 428/34, 167, 906; 52/171; 156/108, 109

[56] References Cited
U.S. PATENT DOCUMENTS 4,085,999 4/1978 Chalroudi ............................ 428/178
4,305,982 12/1981 Hirsch .................................. 428/166

FOREIGN PATENT DOCUMENTS 2946101 5/1981 Fed. Rep. of Germany ........ 52/171
54-124090 9/1979 Japan .................................. 428/166

Primary Examiner—Paul J. Thibodeau
Attorney, Agent, or Firm—Woodard, Weikart, Emhardt & Naughton

[57] ABSTRACT

An insulator for mounting to a window. A pair of plastic layers including a plurality of partitions positioned therebetween form air pockets between the layers. A plurality of suction cups and suction grooves arranged in rows on one outer surface of the sheet removably secure the sheet to a window. The sheet includes a circumferentially extending recessed portion receiving the window frame.

12 Claims, 7 Drawing Figures

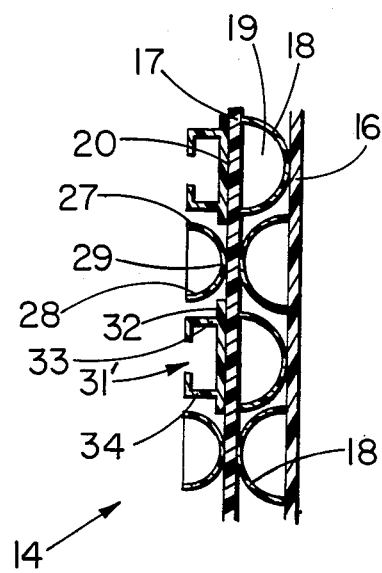
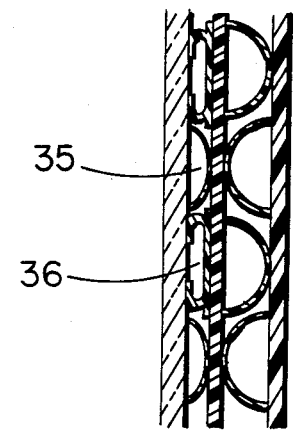
FIG. 3  FIG. 4
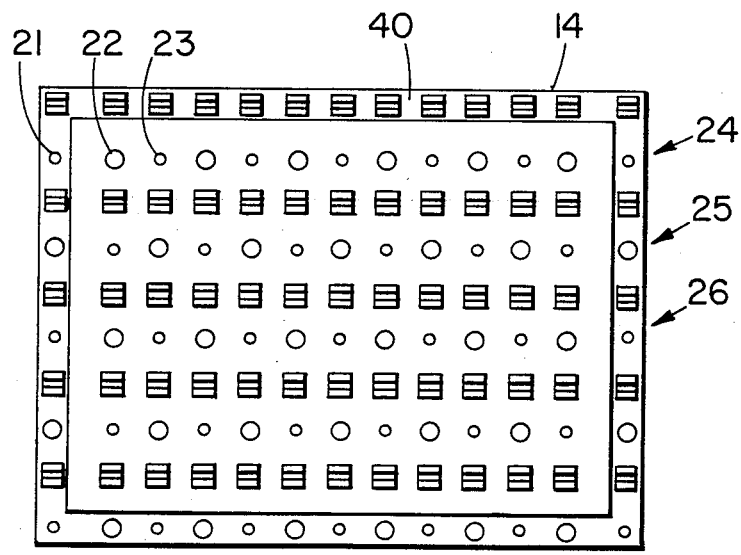
FIG. 5

WINDOW INSULATOR

BACKGROUND OF THE INVENTION

This invention is in the field of heat insulators and more specifically those designed in sheet form. Heat loss is typically prevented through a window by utilizing a plurality of panes of glass mounted either in a wood or metal frame. New construction allows incorporation as original equipment of such a multi-paned window. Older construction requires the addition of a window pane or storm window immediately adjacent the regular window. Such construction is quite involved and is costly to the owner. Disclosed herein is a sheet of insulation material which may be quickly mounted adjacent the window and may be removable therefrom depending upon the season. Further, the insulator disclosed herein is very inexpensive to produce, transport, store and install.

SUMMARY OF THE INVENTION

One embodiment of the present invention is a heat insulator for mounting to a window comprising a flexible sheet of plastic material pervious to light and sized and shaped to entirely cover a window to be insulated, the sheet including a mounting surface positionable adjacent the window, and mounting suction means on the mounting surface and operable to removably secure the sheet to the window when the sheet is forced against the window squeezing the means against the window and creating a suction therebetween.

Another embodiment of the present invention is the combination of a window including a glass portion and a frame surrounding the glass portion, and a plastic sheet with a plurality of pockets of air trapped therein providing heat insulation, the sheet including suction means provided thereon opening towards the window and operable to releasably hold the sheet thereon.

It is an object of the present invention to provide a very inexpensive means for insulating or limiting heat loss through a window.

A further object of the present invention is to provide a window insulator which may be very quickly mounted or removed by the owner without special installation tools or fastening devices.

Yet another object of the present invention is to provide a new and improved window insulator.

Related objects and advantages of the present invention will be apparent from the following description.

BRIEF DESCRIPTION OF THE DRAWINGS

FIG. 3 is an enlarged fragmentary cross-sectional view of the window insulator shown in FIG. 2.

FIG. 4 is the same view as FIG. 3 only showing the insulator mounted to the window.

FIG. 5 is a plan view of the insulator sheet shown mounted in FIG. 2.

DESCRIPTION OF THE PREFERRED EMBODIMENT

Figure 1:
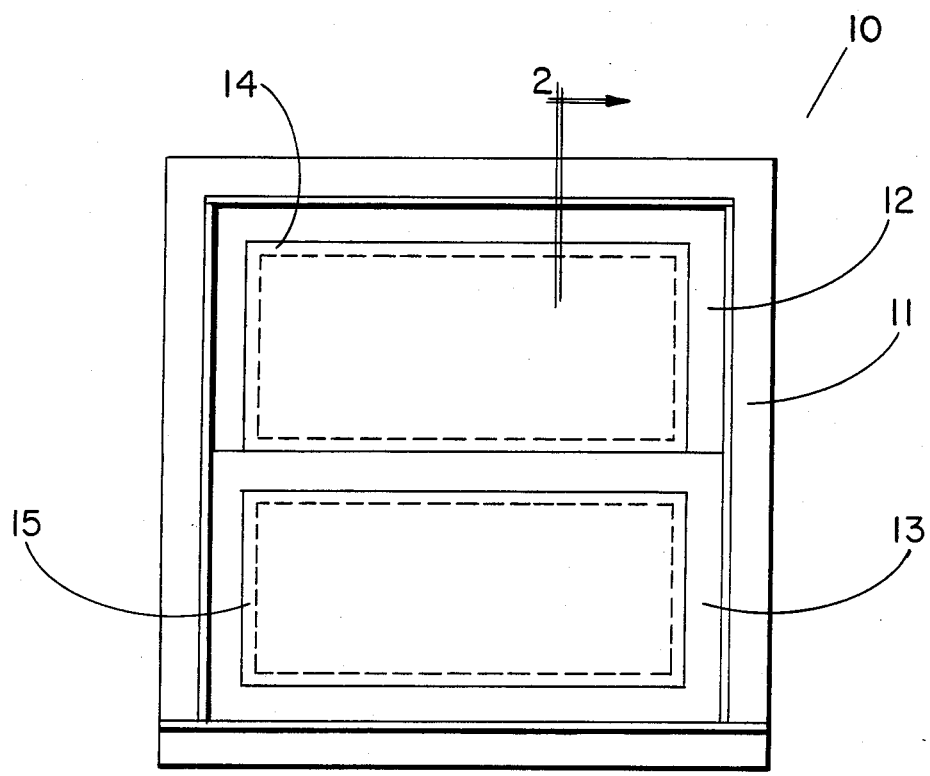
FIG. 1 is a front view of a window having the insulator incorporating the present invention mounted thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a conventional window 10 having conventional molding 11 mounted to a wall and slidably receiving an upper window 12 and lower window 13. Removably mounted to each window 12 and 13 is a separate heat insulator 14 and 15 incorporating the present invention.

Insulator 14 will now be described it being understood that an identical description applies to insulator 15. Insulator 14 is a plastic sheet which may be stored in roll form until ready for use. The sheet is then unrolled and cut to a size such that it will extend entirely over the pane of glass as well as cover at least a portion of the frame surrounding the pane. The sheet includes a pair of spaced apart plastic layers 16 and 17 (FIG. 3) with a plurality of plastic hemispheres 18 connected to and positioned therebetween. Each hemisphere traps a pocket of air 19 spacing layers 16 and 17 apart while at the same time providing an excellent heat insulator. The particular configuration of hemisphere 18 is not important as long as a pocket of air is trapped between layers 16 and 17. Thus, closed compartments may be formed between layers 16 and 17 by a plurality of partitioning walls extending between the layers providing as pockets of air trapped or formed between the layers thereby minimizing heat loss through the sheet.

Integrally attached to the outer surface 20 of layer 17 are a plurality of mounting suction means for removably securing sheet 14 to the window pane and surrounding frame. The suction means take the form of a plurality of suction cups and flexible suction grooves which may be forced against the pane and frame forcing at least some of the air away from within the suction devices and creating an area of reduced air pressure between the suction device and the pane and frame.

The suction cups attached to surface 20 are arranged in a plurality of rows with each row having a relatively large suction cup followed by a smaller size suction cup in cyclical fashion spaced across the width of the sheet. For example, a small sized suction cup 21 is followed by a large suction cup 22 in turn followed by a small suction cup 23 and so on across the width of sheet 14 with the suction cups being arranged in a plurality of rows 24, 25, 26 and additional rows through the length of the sheet. The small and large suction cups are identical with the exception of the diameter of the area enclosed by the cup when mounted to the pane. For example, suction cup 27 has a wall 28 hemispherical in configuration with the apex 29 of the wall integrally attached to layer 17 and with the cup opening outwardly to removably engage glass pane 30 or wood or metallic frame 31 depending upon the location of the suction cup.

Interspaced between the rows of suction cups are a plurality of equally sized suction grooves 31' (FIG. 3). Each groove includes a base wall 32 integrally attached to layer 17 and a pair of outwardly extending plastic arms 33 and 34 which turn inwardly being spaced apart to form groove 31'. In order to mount the insulator to glass pane 30 or frame 31, the insulator 14 is pressed against the glass pane and frame thereby deforming the suction cups and suction grooves forcing at least a portion of the air normally positioned in the cup and groove away therefrom and creating a low pressure area 35 and 36 (FIG. 4) removably securing the insulator to the pane and frame. As shown in FIG. 4, the flexible walls of the suction cup and groove deform outwardly and remain deformed until the insulator is pulled and removed from the glass pane and frame.

The insulator sheet is made entirely of plastic and is sufficiently flexible to conformingly fit to the glass pane and frame. Further, the plastic material is transparent in nature allowing the user to see through the insulator when looking through the window.

Various embodiments are contemplated and included herein. For example, the insulator sheet may be of constant thickness across the width and length thereof and sufficiently flexible to conformingly fit to the window. Likewise, the insulator sheet may be manufactured to fit a particular configured window or in other words include a circumferentially extending groove to position the insulator sheet adjacent the frame and glass pane. For example, the insulator sheet shown in FIGS. 2 and 5 includes a circumferentially extending edge portion 40 extending entirely around the periphery of the insulator sheet. Edge portion 40 is indented or offset from the main body 41 of the insulator sheet allowing the main body to be positioned immediately adjacent the glass pane 30 while the edge portion 40 is positioned immediately adjacent the offset and outwardly extending frame 31. Both the main body 41 and edge portion 40 includes a plurality of suction cups or suction grooves to removably hold the insulator to the window. Likewise, the cups are arranged in rows interspaced between rows of suction grooves.

Many variations are contemplated and included in the present invention. For example, insulator 14 (FIG. 2) may be manufactured not only in large sheets and then cut to fit a particular window but may also be manufactured to fit standard window sizes to cover only the glass or both the glass and frame. Likewise, the suction cup side of the insulator may be manufactured in several forms. For example, the suction cups may be replaced by removable adhesive. Likewise, accommodation for a non-planar window may be provided since the glass portion of the window is typically offset from the frame. The insulator or insulation sheet may be sufficiently pliable to allow for the sheet to bend to accommodate the rise from the glass to the frame so long as suction is applied simultaneously to the glass and frame or the insulation sheet may be indented (FIG. 5) to receive the frame. The sheets may be manufactured in a standard 4' by 8' size to allow the homeowner to cut the sheet to the size of the glass and frame or just the glass whichever is so desired. The insulation sheet may be manufactured for a specific glass and frame size or just the glass size.

Figure 6:
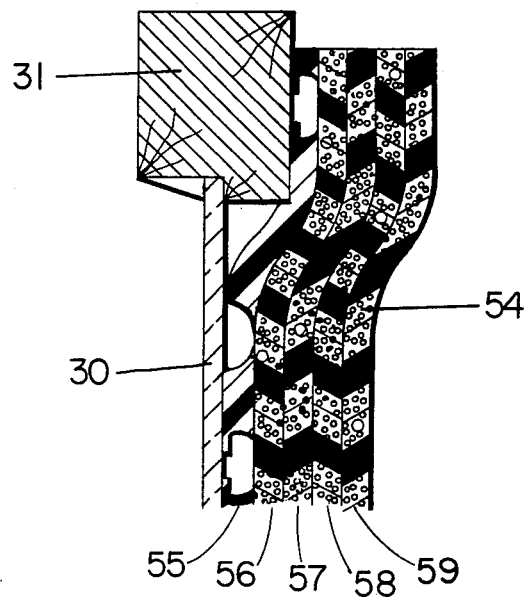
FIG. 6 is an enlarged fragmentary cross-sectional view showing an alternate embodiment of the insulator sheet shown in FIG. 2.
Figure 7:
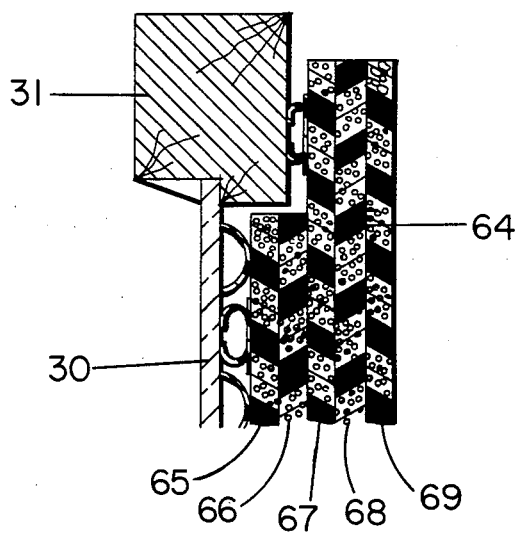
FIG. 7 is an enlarged fragmentary cross-sectional view of an alternate embodiment of the insulator sheet shown in FIG. 5.

The thickness of the insulation sheet may be varied. In one embodiment, the width of the insulation sheet adjacent the glass was from ¼ inch to 1½ inches with the insulation sheet being of the same thickness adjacent the frame as compared to the glass or in an alternate embodiment having a smaller thickness. FIG. 6 depicts the insulator having a constant thickness with the insulation sheet being sufficiently pliable to be positioned immediately adjacent the frame as well as the glass. FIG. 7 on the other hand depicts an insulation sheet having a thickness greater adjacent the glass as compared to the thickness of the sheet adjacent the frame.

Figure 2:
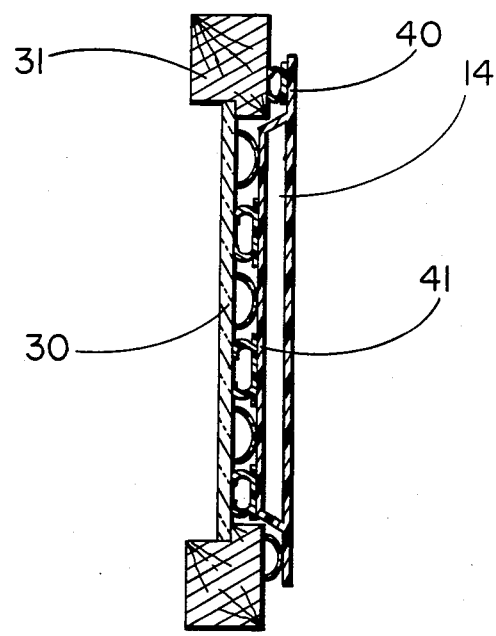
FIG. 2 is an enlarged cross-sectional view taken along a line and viewed in the direction of the arrow 2 in FIG. 1.

In the two embodiments shown in FIGS. 6 and 7, insulation sheets 54 and 64 are identical to the insulation sheet 14 previously described with the exception that each sheet 54 and 64 is manufactured by securing together a plurality of individual sheets. For example, insulation sheet 54 includes four sheets 55 through 58 secured together in adjacent fashion whereas insulation sheet 64 includes individual sheets 65 through 69 secured together in adjacent fashion. Individual sheets may be attached together by any number of means such as by adhesives. In any case, all three insulation sheets 14, 54 and 64 include a plurality of air bubbles positioned throughout the insulation sheet to provide for effective insulation. In the case of insulation sheets 54 and 64, each individual sheet 55 through 58 and 65 through 69 likewise includes a plurality of air bubbles such as air bubble 18 (FIG. 3) forming a plurality of air pockets. Sheet 54 is identical in configuration with the insulation sheet depicted in FIG. 2 being sufficiently pliable to rest against the frame and glass whereas insulation sheet 64 is identical in configuration to the insulation sheet depicted in FIG. 5 having an indented portion to complementarily receive the window frame. Both insulation sheets 54 and 64 include rows of alternating suction cups 24, 25 and 26 (FIG. 5) and are spaced between rows of suction grooves 31' as previously described for the embodiment depicted in FIG. 3. The suction cups and suction grooves may be integrally formed in the side of the insulation sheet facing the window such as shown in FIG. 6 or may be individually formed such as shown in FIGS. 7 and 2.

It will be obvious from the above description that the present invention provides a new and improved window insulator. It will be further obvious that the window insulator disclosed herein is relatively inexpensive to produce and may be installed by the user without requiring special tools or fastening devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A heat insulator for mounting to a window comprising:
   a plurality of flexible insulator sheets of plastic material secured together being pervious to light and sized and shaped to entirely cover a window to be insulated, said plurality of sheets including a mounting surface positionable adjacent said window; and,
   mounting suction means on said mounting surface and operable to removably secure said plurality of sheets to said window when said sheets are forced against said window squeezing said means against said window and creating a suction therebetween, said means including a plurality of suction cups and a plurality of grooves on said mounting surface opening outwardly towards said window with said cups arranged in rows and said grooves arranged in rows alternating with said rows of cups.

2. The insulator of claim 1 wherein said sheets include an outer surface spaced apart from said mounting surface and a plurality of air pockets located between said outer surface and mounting surface acting as a heat insulator.

3. The insulator of claim 2 wherein said mounting means includes walls defining each of said grooves which are flexible to allow said grooves to collapse against said window creating a suction holding force.

4. The insulator of claim 3 wherein said sheets are stored in a roll and may be unrolled and cut to fit a particular window.

5. The insulator of claim 4 in combination with a window including a glass portion and the frame portion surrounding said glass portion and wherein:
   said sheets include a circumferentially extending recessed portion facing said window with said frame positioned therein to conformingly fit to said glass portion and said frame.

6. The combination of:
   a window including a glass portion and a frame surrounding said glass portion; and,
   a plurality of flexible plastic sheets pervious to light with a plurality of pockets of air trapped therein providing heat insulation, said sheets including suction means provided thereon opening towards said window and operable to releasably hold said sheets thereon, said sheets include a circumferentially extending recessed portion facing said window with said frame positioned therein to conformingly fit said sheets to said glass portion and said frame.

7. The combination of claim 6 wherein said suction means includes a plurality of suction cups arranged in rows extending across said sheets and a plurality of suction grooves also arranged in rows but interspaced between said rows of suction cups.

8. The combination of claim 7 wherein said grooves includes walls defining same which are flexible to allow said grooves to be collapsed against said window creating a suction holding force.

9. The combination of claim 8 wherein said suction cups in each row include different sizes of suction cups.

10. The combination of claim 9 wherein said sheets include a pair of spaced apart layers of plastic with said air pockets positioned therebetween.

11. The combination of claim 9 wherein said plurality of sheets include two sheets and a plurality of plastic hemispheres connected to and positioned between said two sheets defining a plurality of air pockets.

12. The combination of claim 11 wherein said suction cups are large size cups and small size cups with said large size cups positioned in alternate fashion with said small size cups.

* * * * *